US005692689A

United States Patent [19]

Shinn

[11] Patent Number: 5,692,689
[45] Date of Patent: Dec. 2, 1997

[54] CUTTER DEVICE AND METHOD FOR CLEANING AND MULCHING TREES

[76] Inventor: Rickey D. Shinn, 904 Horizon Ct., Concord, N.C. 28027

[21] Appl. No.: 658,709

[22] Filed: Jun. 5, 1996

[51] Int. Cl.$^6$ .............................. B02C 13/04; A01G 23/08
[52] U.S. Cl. .................. 241/101.72; 241/107.74; 241/285.1; 144/334; 144/24.12
[58] Field of Search .................. 241/101.72, 101.74, 241/101.742, 82, 273.3, 285.1, 185.5, 186.2; 144/375, 24.12, 34.1, 334

[56] References Cited

U.S. PATENT DOCUMENTS

| 1,312,450 | 8/1919 | McKoy et al. | |
|---|---|---|---|
| 3,044,509 | 7/1962 | Kehler | 144/2 |
| 3,859,910 | 1/1975 | Swanson | 241/101.74 X |
| 3,937,261 | 2/1976 | Blum | 241/101.74 X |
| 4,041,996 | 8/1977 | Grover | 144/2 |
| 4,065,062 | 12/1977 | Heslop | 241/101 |
| 4,121,777 | 10/1978 | Kolstad et al. | 241/58 |
| 4,157,164 | 6/1979 | Helm et al. | 241/101.7 |
| 4,180,107 | 12/1979 | Grover | 144/2 |
| 4,297,073 | 10/1981 | Schmid et al. | 241/101.72 X |
| 4,355,670 | 10/1982 | Ohrberg et al. | 144/34 |
| 4,607,799 | 8/1986 | Currie | 241/101.72 |
| 4,769,977 | 9/1988 | Milbourn | 56/15.2 |
| 4,771,953 | 9/1988 | Morey | 241/185.5 X |
| 4,848,423 | 7/1989 | Yoder | 144/2 |
| 4,998,676 | 3/1991 | Sirol | 241/285.1 X |
| 5,070,920 | 12/1991 | Morey | 144/237 |
| 5,109,895 | 5/1992 | Rassier | 241/101.72 X |
| 5,158,126 | 10/1992 | Lang | 144/375 |
| 5,259,692 | 11/1993 | Beller et al. | 241/101.72 X |
| 5,289,859 | 3/1994 | Minton, Jr. et al. | 144/24.12 |
| 5,355,918 | 10/1994 | Lang | 144/2 |
| 5,419,380 | 5/1995 | Bot | 144/334 |
| 5,435,359 | 7/1995 | Craft | 144/334 |
| 5,495,987 | 3/1996 | Slaby | 241/101.74 X |
| 5,499,771 | 3/1996 | Esposito et al. | 241/101.74 |
| 5,588,474 | 12/1996 | Egging | 144/334 X |

FOREIGN PATENT DOCUMENTS

| 42 18 005 | 12/1993 | Germany | 144/24.12 |

*Primary Examiner*—Daniel W. Howell
*Assistant Examiner*—Julie A. Krolikowski
*Attorney, Agent, or Firm*—Adams Law Firm, P.A.

[57] ABSTRACT

A cutter device is provided for being attached to an end of a movable working arm of a self-propelled vehicle for clearing and mulching trees. The cutter device includes a rotatably mounted drum with a plurality of spaced cutter teeth attached to an exterior of the drum for engaging and grinding the trees. A shield covers a portion of the drum and contains the deflection of wood debris outwardly from the drum during operation. The shield has an interior wall spaced apart from the cutter teeth and cooperating with the rotating drum to define a debris flow path through the device. At least one deflector plate is attached to the interior wall of the shield. The deflector plate extends inwardly into the debris flow path in a direction towards the cutter teeth of the drum. The interior wall of the shield and the deflector plate collectively form a mulch zone in an area between the cutter teeth and the shield and upstream of the deflector plate for slowing the movement of debris along the flow path, and deflecting the debris back into contact with the cutter teeth for being further cut and reduced in size.

15 Claims, 5 Drawing Sheets

CUTTER DEVICE AND METHOD FOR CLEANING AND MULCHING TREES

TECHNICAL FIELD AND BACKGROUND OF THE INVENTION

This invention relates to a cutter device and method for clearing and mulching trees. The invention is mounted on the working arm of a self-propelled vehicle, such as a backhoe, and is particularly applicable for clearing large areas of land for construction projects, such as the installation of underground piping or above ground construction. Complete clearing of trees, stumps, and brush is accomplished relatively quickly and in a safe and efficient manner.

When cutting trees, the invention creates a fine wood mulch of substantially uniform size and dimension. Due to the small size of the mulch, there is less danger of being injured by debris deflecting outwardly from the cutter device during operation. Moreover, the invention may be readily adapted to provide for automatic collection and recycling of the debris for use in landscaping, particle board construction, or for other purposes.

One prior art cutter device is disclosed in U.S. Pat. No. 5,499,771. This device includes a rotating cutter drum and a semi-cylindrical shield which covers a portion of the drum for containing the deflection of wood debris outwardly from the drum during operation. The device aims to reduce the size of wood debris exiting from beneath the shield by positioning the shield at a constant radial distance from the cutter drum.

As compared to the present invention, the cutter device of '771 patent has proven to be inadequate. The prior art device creates relatively large and long strips of wood debris which are generally not desirable for collection and recycling, and which increase the potential for injury to nearby workers during operation. The air flow generated by the rotating cutter drum moves the debris along a flow path closely adjacent to the inner wall of the shield away from the teeth of the drum. Thus, once an initial cut is made, the debris is exposed to relatively little contact with the drum teeth before being exhausted outwardly from beneath the shield. These generally long strips of debris not only increase the potential for injury, but may also interfere with proper operation and efficiency of the rotating cutter drum.

SUMMARY OF THE INVENTION

Therefore, it is an object of the invention to provide a cutter device for being mounted on the working arm of a backhoe for clearing and mulching trees.

It is another object of the invention to provide a cutter device with reduced danger of injury from deflecting debris during operation.

It is another object of the invention to provide a cutter device which slows the flow of debris through the device, and causes increased contact between the debris and cutter teeth of the rotating drum as the debris passes beneath the shield.

It is another object of the invention to provide a cutter device which creates a relatively fine mulch suitable for collection and reuse in landscaping.

It is another object of the invention to provide a cutter device which creates a mulch of relatively uniform size and dimension.

These and other objects of the present invention are achieved in the preferred embodiments disclosed below by providing a cutter device for being attached to an end of a movable working arm of a self-propelled vehicle for clearing and mulching trees. The cutter device includes a rotatably mounted drum with a plurality of spaced cutter teeth attached to an exterior of the drum for engaging and grinding the trees. A shield covers a portion of the drum and contains the deflection of wood debris outwardly from the drum during operation. The shield has an interior wall spaced apart from the cutter teeth and cooperating with the rotating drum to define a debris flow path through the device.

At least one deflector plate is attached to the interior wall of the shield. The deflector plate extends inwardly into the debris flow path in a direction towards the cutter teeth of the drum. The interior wall of the shield and the deflector plate collectively form a mulch zone in an area between the cutter teeth and the shield and upstream of the deflector plate for slowing the movement of debris along the flow path, and deflecting the debris back into contact with the cutter teeth for being further cut and reduced in size.

According to one preferred embodiment of the invention, the shield includes a substantially flat top wall, and substantially flat front and rear side walls attached to the top wall. The front and rear side walls extend at respective obtuse angles relative to the top wall, and together with the top wall, collectively cover an upper portion of the drum.

Preferably, the interior angle formed between the front side wall and the top wall of the shield is between 110 and 130 degrees.

Preferably, the interior angle formed between the rear side wall and the top wall of the shield is between 110 and 130 degrees.

According to another preferred embodiment of the invention, the deflector plate is attached to the top wall of the shield.

According to yet another preferred embodiment of the invention, the deflector plate extends from the top wall at an angle substantially perpendicular to the front side wall of said shield.

According to yet another preferred embodiment of the invention, a second deflector plate is attached to the rear side wall of the shield, and defines a second mulch zone downstream of the first mulch zone for further slowing and deflecting debris back into contact with the cutter teeth.

According to yet another preferred embodiment of the invention, the second deflector plate extends from the rear side wall at an angle substantially perpendicular to the top wall of the shield.

According to yet another preferred embodiment of the invention, the shield further includes substantially flat, front and rear end walls attached to respective from and rear side walls for covering a front and rear portion of the drum.

Preferably, the front end wall extends at an angle of between 120 and 140 degrees relative to the from side wall of the shield.

Preferably, the rear end wall extends at an angle of between 120 and 140 degrees relative to the rear side wall of the shield.

According to another preferred embodiment of the invention, the cutter teeth are arranged in a plurality of rows spaced apart around the circumference of the drum.

According to yet another preferred embodiment of the invention, adjacent ones of the rows are off-set to increase contact between the cutter teeth and the debris as the debris moves along the flow path.

According to yet another preferred embodiment of the invention, an outwardly extending rake is attached to a rear portion of the shield for being maneuvered by the working arm of the vehicle to clear sections of cut trees from the path of the vehicle.

An embodiment of the method according to the invention comprises the steps of attaching a cutter device to an end of a movable, working arm of a self-propelled vehicle. The cutter device includes a rotatably mounted drum with a plurality of spaced cutter teeth attached to an exterior of the drum for engaging and grinding the trees. A shield covers a portion of the drum and contains the deflection of wood debris outwardly from the drum during operation.

A debris flow path is created through the cutter device and between an interior wall of the shield and the cutter teeth of the rotating drum. As the debris moves along the flow path, it is deflected away from the interior wall of the shield and back into contact with the cutter teeth for being further cut and reduced in size.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
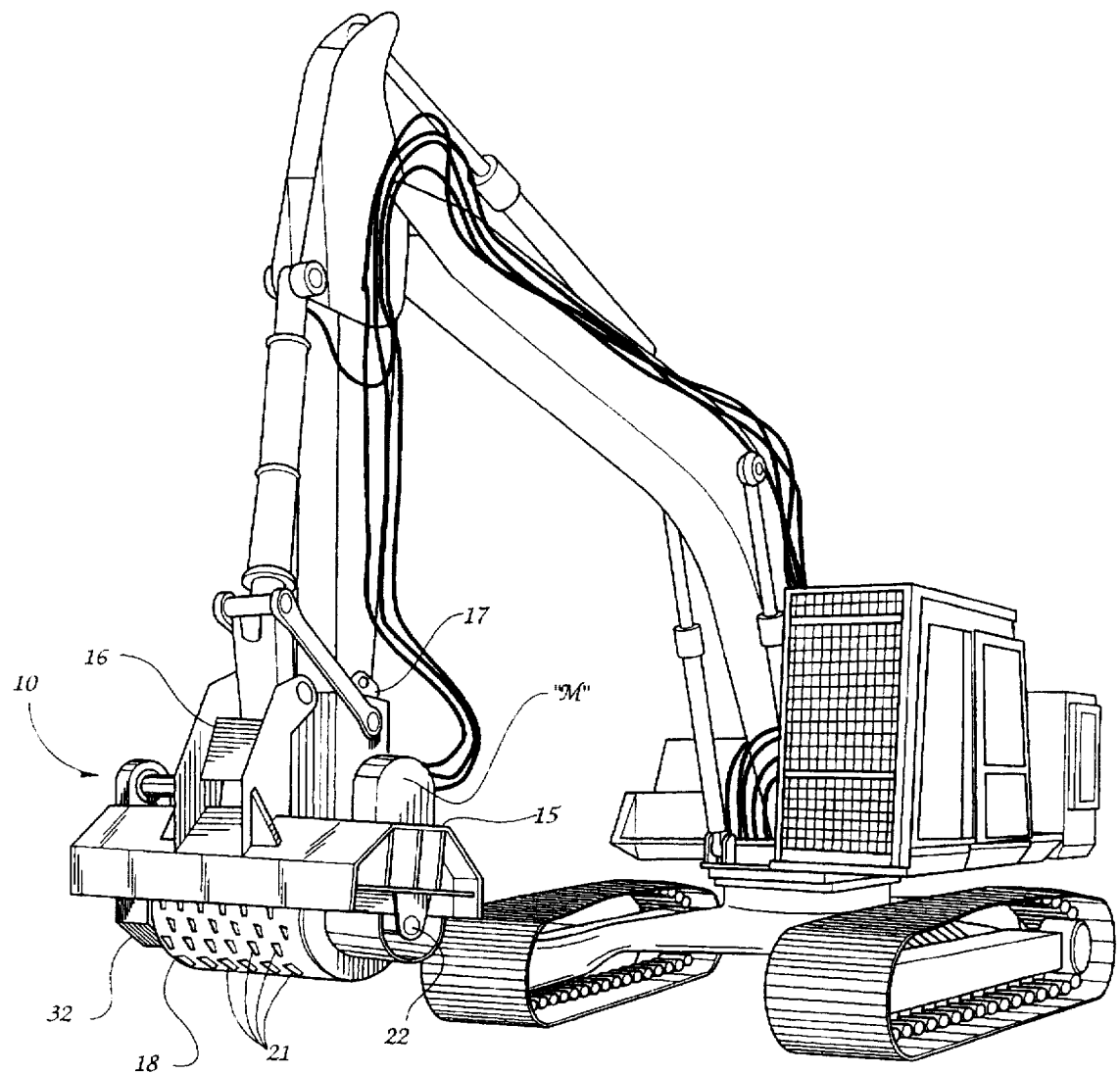
FIG. 1 is an environmental perspective view of a backhoe with an attached cutter device according to one preferred embodiment of the invention.
Figure 2:
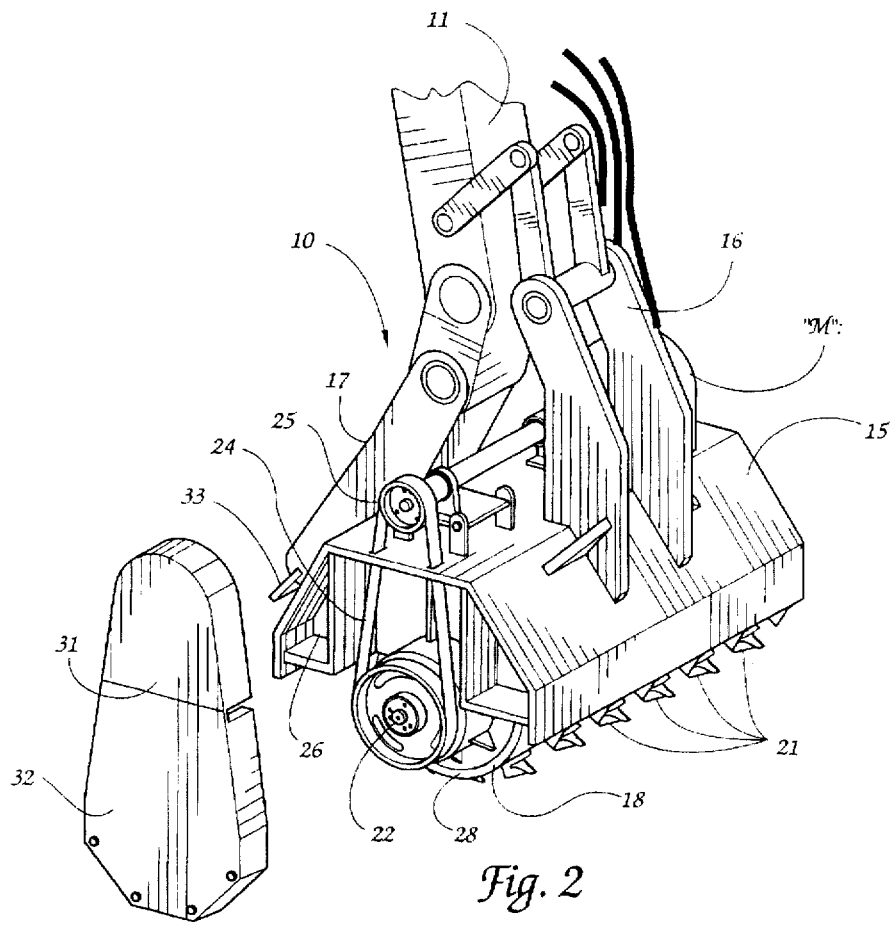
FIG. 2 is a side perspective view of the cutter device as attached to the working arm of the backhoe, and showing the cover plate and pulley cap removed.
Figure 3:
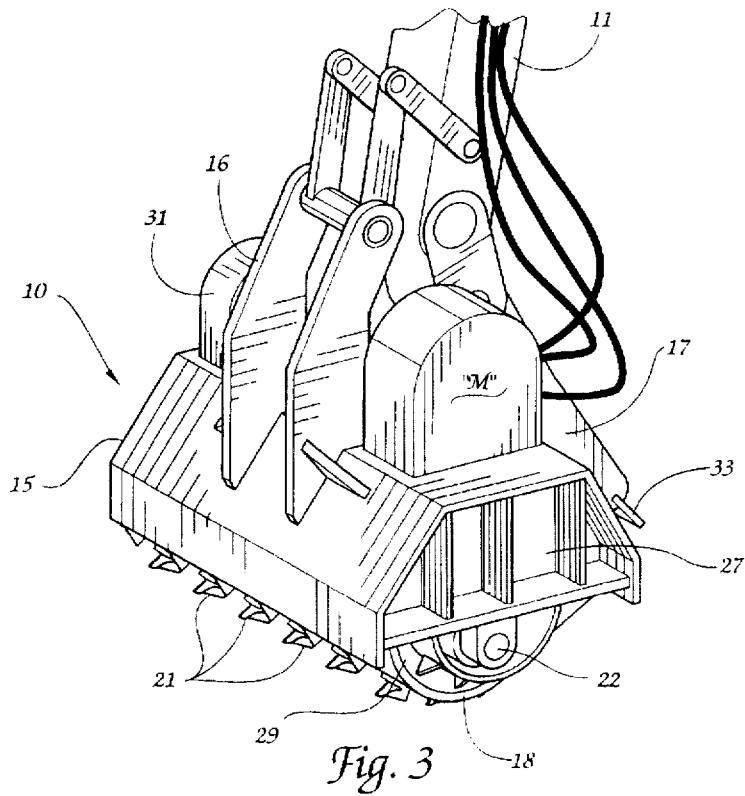
FIG. 3 is an opposite side perspective view of the cutter device as attached to the working arm of the backhoe.
Figure 4:
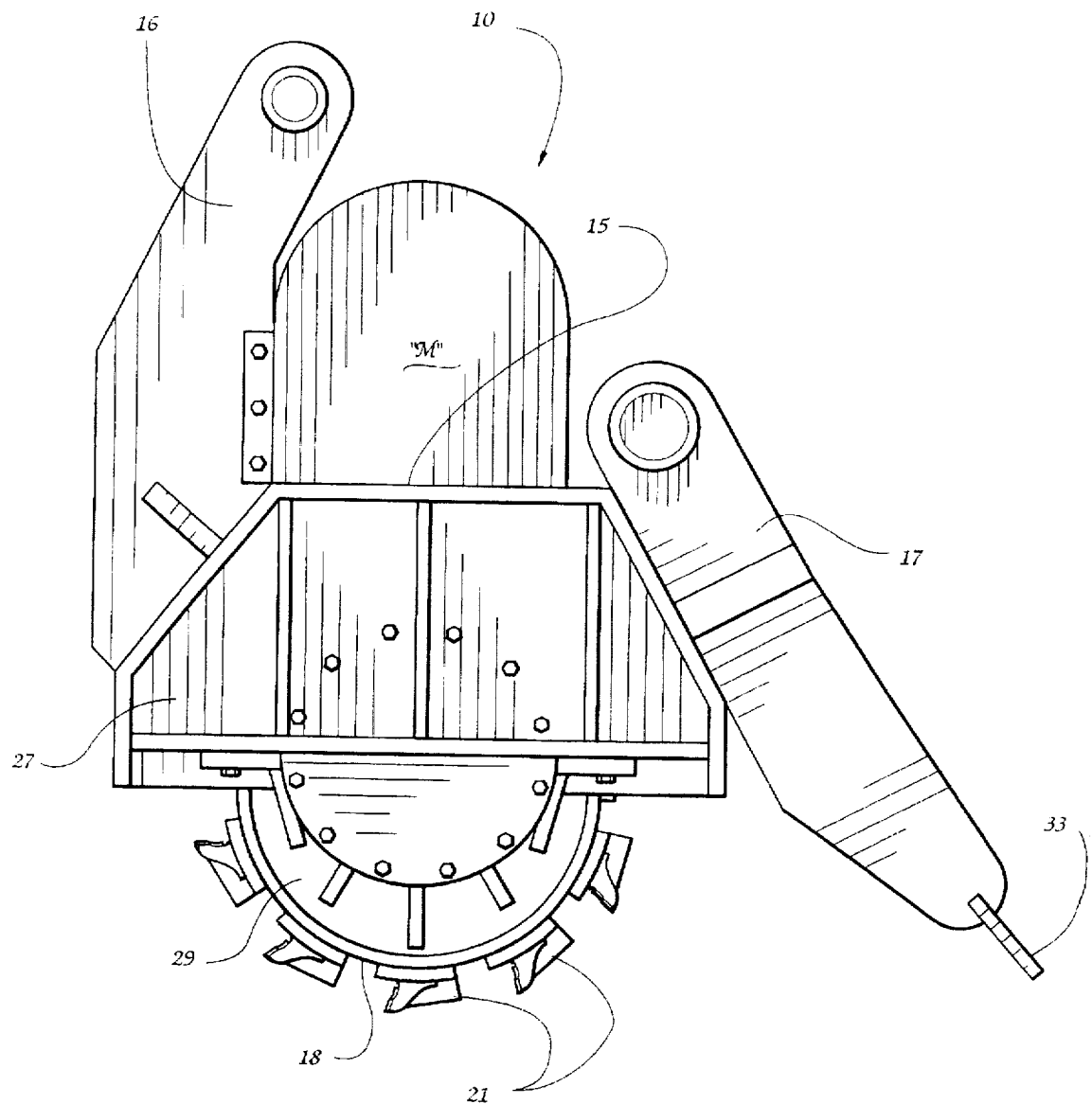
FIG. 4 is a side elevational view of the cutter device.
Figure 5:
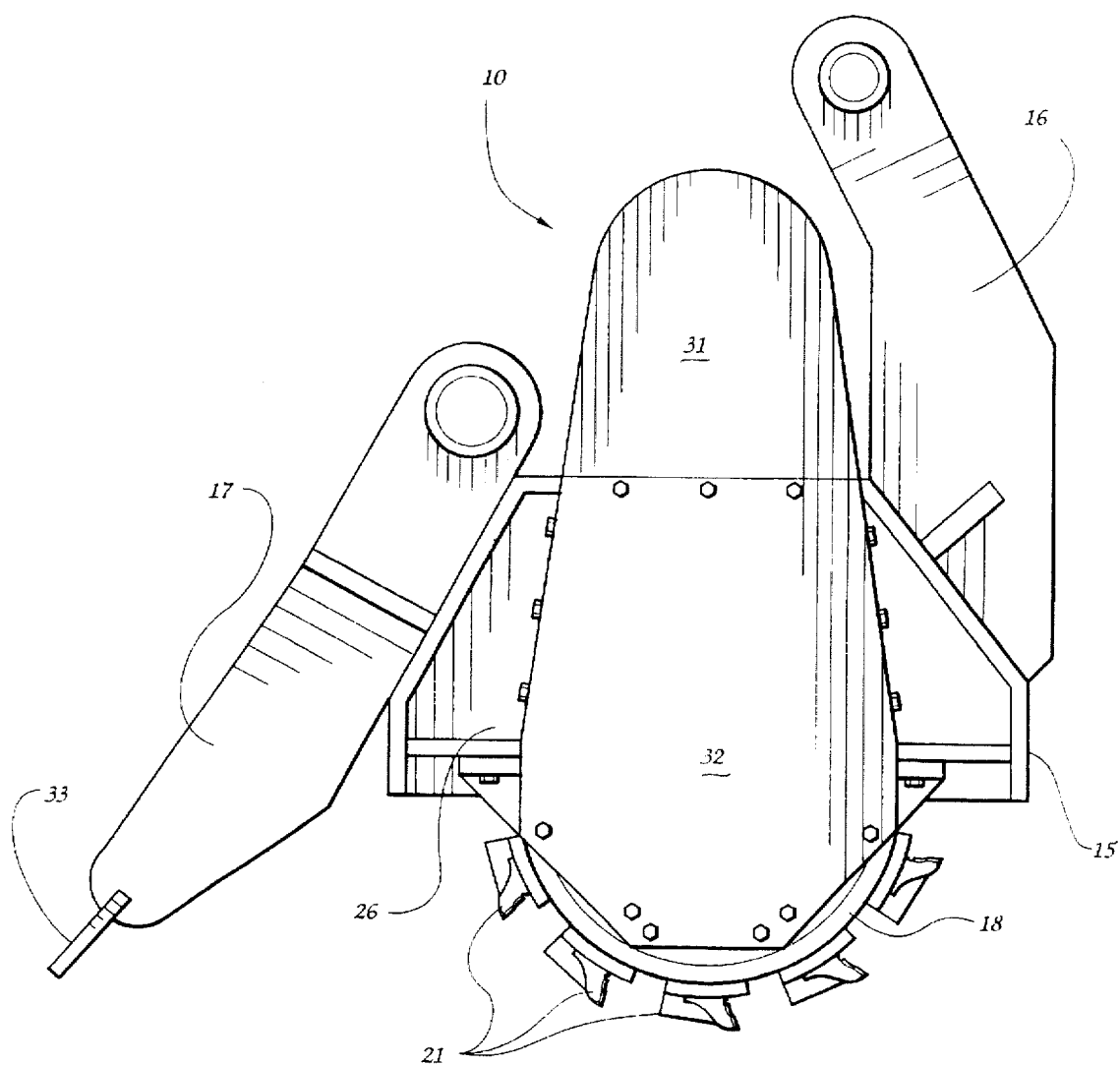
FIG. 5 is an opposite side elevational view of the cutter device.

Referring now specifically to the drawings, a cutter device according to the present invention is illustrated in FIG. 1 and shown generally at reference numeral 10. The cutter device 10 is adapted for being mounted on the working arm 11 of a self-propelled vehicle, such as a backhoe 12, and is particularly applicable for clearing large areas of land to facilitate installation of underground piping or above ground construction.

As is best shown in FIGS. 2–5, the cutter device 10 includes a shield 15 with attached front and rear mounting feet 16 and 17 for securing the cutter device 10 to the arm 11 of the backhoe 12. A drum 18 is rotatably mounted beneath the shield 15, and includes a number of outward-extending teeth 21 for engaging and grinding trees. The shield 15 covers an upper portion of the drum 18 to contain the deflection of debris outwardly from the cutter device 10 during operation, and to increase the cutting of debris to form a mulch of relatively small, uniform size.

The drum 18 is carried by an elongated drive shaft 22, and actuated by one or more belts 24 and pulleys 25 connected to the drive shaft 22 and a hydraulic motor "M". The drive shaft 22 is supported at opposite ends by support plates 26 and 27 mounted to the interior of the shield 15. According to one embodiment, the drum 18 is 24 inches in diameter and rotates at between 850–1500 rpm.

Preferably, circular end caps 28 and 29 are located on opposite open ends of the drum 18 adjacent to respective support plates 26 and 27 to prevent debris from entering the drum 18 and interfering with operation of the drive shaft 22. The end caps 28 and 29 are secured to the support plates 26 and 27, and include respective bearing joints (not shown) engaging the shaft 22 to reduce the loss of energy through friction. Top and side covers 31 and 32 are preferably attached to the shield 15 for protecting the belt 24 and pulley 25 against damage when operating the cutter device 10. In addition, an outwardly-extending rake 33 is attached to the rear mounting foot 17 on the arm 11 of the backhoe 12, and is maneuvered by the backhoe operator to clear sections of cut trees from the path of the backhoe 12.

Construction and Operation of the Shield 15

Figure 6:
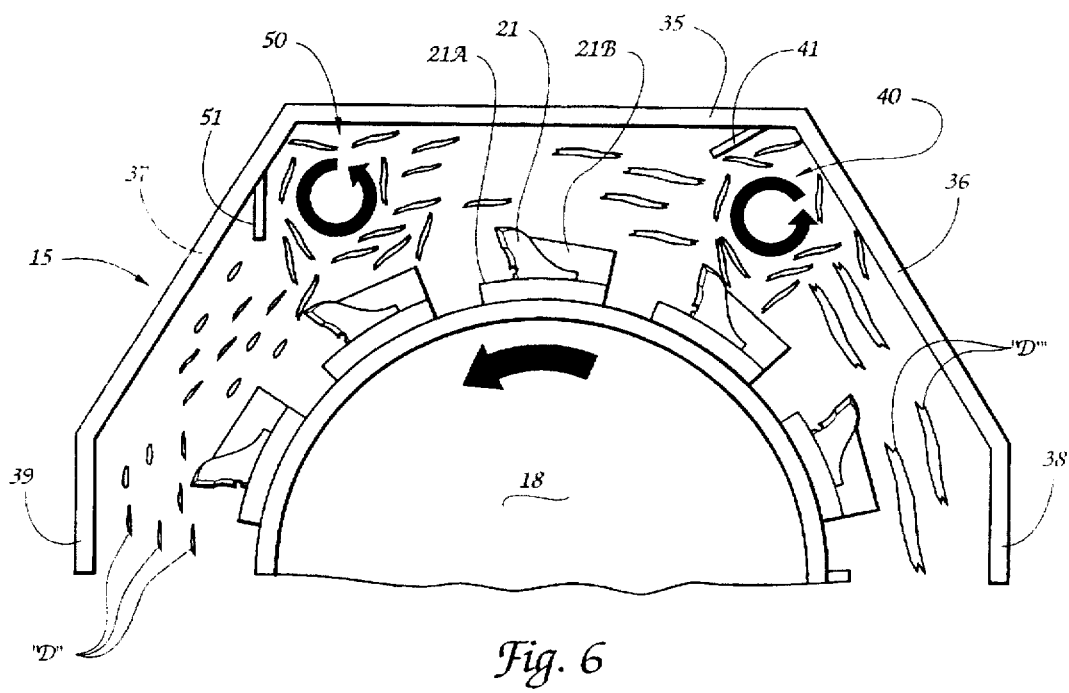
FIG. 6 is a fragmentary, cross-sectional view of the cutter device showing the flow of wood debris through the device.

Referring to FIG. 6, the shield 15 includes a top wall 35, front and rear side walls 36 and 37 attached to the top wall 35, and front and rear end walls 38 and 39 attached to respective front and rear side walls 36 and 37. The walls 35–39 are substantially flat, and are attached together by welding or other suitable means. The interior angle defined by each of the front and rear side walls 36 and 37 relative to the top wall 35 is about 110–130 degrees. The angle defined by each of the front and rear end walls 38 and 39 relative to the front and rear side walls 36 and 37, respectively, is about 120–140 degrees.

The walls 35–39 of the shield 15 are spaced-apart from the teeth 21 of the drum 18, and cooperate with the drum 18 when rotating to create a debris flow path through the cutter device 10. As the teeth 21 engage the tree for cutting, relatively large pieces of wood debris "D" enter an area beneath the shield 15 and are moved downstream along the flow path to a first mulch zone 40 formed at the junction of the front side wall 36 and top wall 35. The mulch zone 40 is an enlarged open area defined by portions of the front side wall 36 and top wall 35, and an angled deflector plate 41 attached to the top wall 35. The deflector plate 41 preferably extends the entire length of the shield 15, and projects inwardly about 1–2 inches towards the teeth 21 at an angle of about 90 degrees relative to the front side wall 36, and preferably along a notional line generally tangent to the peripheral surface of the drum 18. The deflector plate 41 and walls 35, 36 cooperate to slow the movement of debris "D" along the flow path, and to deflect the debris "D" back into contact with the teeth 21 for further cutting.

From the first mulch zone 40, the debris "D" moves further downstream along the flow path to a second mulch zone 50 formed at the junction of the top wall 35 and rear side wall 37. The second mulch zone 50 is a second enlarged open area defined by portions of the top wall 35 and rear side wall 37, and a second deflector plate 51 attached to the rear side wall 37. The deflector plate 51 preferably extends the entire length of the shield 15, and projects inwardly about 1–2 inches towards the teeth 21 at an angle of about 90 degrees relative to the top wall 35, and preferably along a notional line generally tangent to the peripheral surface of the drum 18. The deflector plate 51 and walls 35, 37 cooperate to slow the movement of debris "D" along the flow path, and to deflect the debris "D" back into contact with the teeth 21 for further cutting. The debris "D" exiting the cutter device 10 downstream of the second mulch zone 50 is a relatively fine mulch of generally uniform size and dimension.

Figure 7:
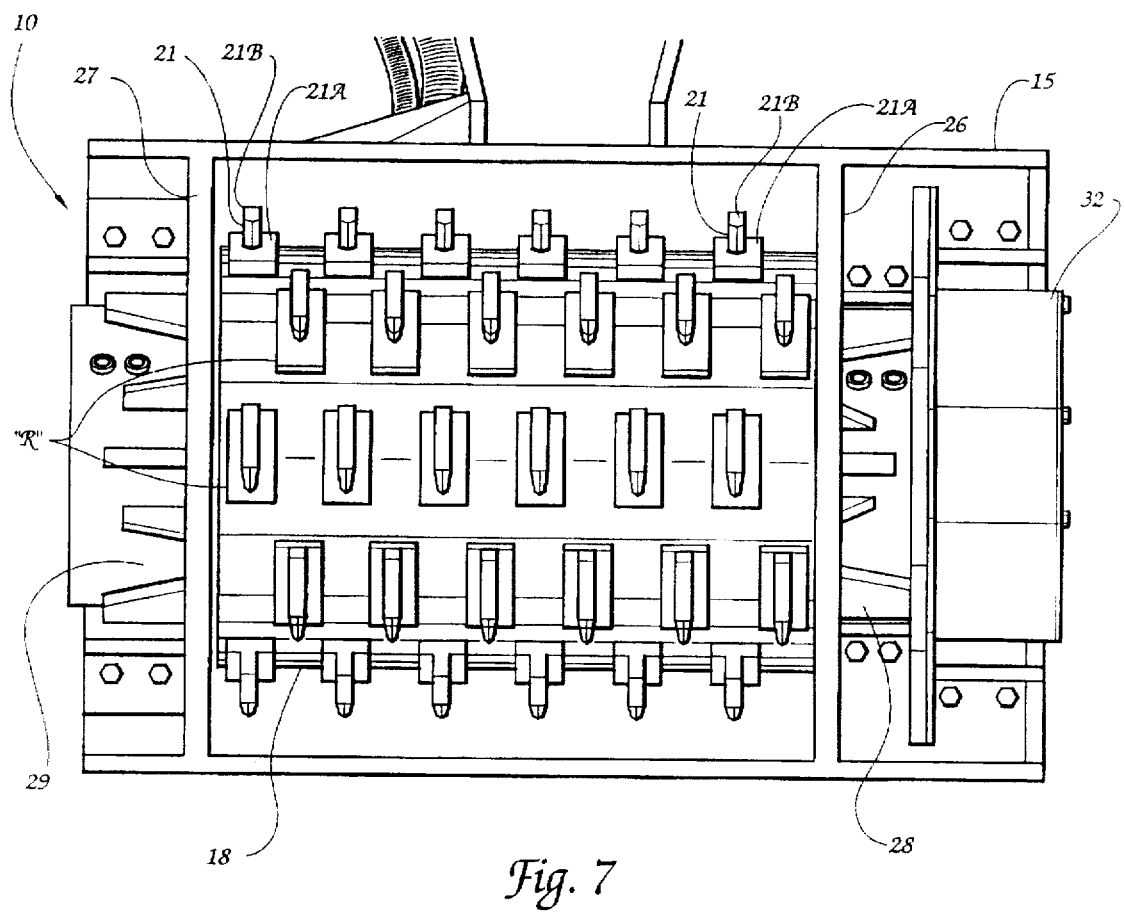
FIG. 7 is a bottom plan view of the cutter device showing the arrangement of cutter teeth on the exterior of the drum.

In addition to the mulch zones 40 and 50 described above, the particular arrangement of teeth 21 on the drum 18 promotes further cutting of debris, and causes increased air flow through the cutter device 10. As shown in FIGS. 6 and 7, each tooth 21 is carried by a holder 21A and includes a reinforced backing 21B to strengthen the attachment of the tooth 21 to the drum 18. The holders 21A are approximately 3.0 inches wide and 1.5 inches tall, respectively, and are attached to the outer drum surface by welding. The teeth 21 are spaced apart in rows "R" of 6–8 along the circumference of the drum 21 with adjacent rows "R" being slightly off-set from one another to increase the total number of teeth 21 contacting the debris as it moves through the cutter device 10. The holders 21A of two adjacent rows "R" collectively span substantially the entire length of the drum 18, thereby increasing the overall amount of air drawn into the flow path beneath the shield 15 during rotation of the drum 18. Preferably, the air flows through the cutter device 10 at about 100–135 cfm.

In an alternative embodiment (not shown), the cutter device has a vacuum system including a length of hollow, flexible conduit communicating with the interior of the shield downstream of the second mulch zone for collecting the mulch as it exits the shield. The conduit extends from the shield to a collection basket attached to the backhoe for storing the mulch.

A cutter device is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A cutter device for being attached to an end of a movable working arm of a self-propelled vehicle for clearing and mulching trees, said cutter device comprising:
   (a) a rotatably-mounted drum;
   (b) a plurality of spaced cutter teeth attached to an axially-extending peripheral surface of said drum for engaging and grinding trees;
   (c) a shield covering a portion of said drum, and comprising a substantially flat top wall and substantially flat front and rear side walls attached to the top wall for containing the deflection of wood debris outwardly from said drum during operation, and the walls of said shield collectively defining an interior surface spaced apart from said cutter teeth and cooperating with said rotating drum to define a debris flow path through the device;
   (d) at least one deflector plate attached to at least one of the top and rear side walls on the interior surface of said shield, and extending inwardly into the debris flow path at an angle of greater than 90 degrees to the wall which it is attached, and along a notional line generally tangent to the peripheral surface of said drum; and
   (e) said deflector plate and the interior surface of said shield adjacent to and upstream of said deflector plate cooperating to form a mulch zone in an area between the cutter teeth and said shield for slowing the movement of debris along the flow path, and deflecting the debris back into contact with said cutter teeth for being further cut and reduced in size.

2. A cutter device according to claim 1, wherein the interior angle formed between the front side wall and the top wall of said shield is between 110 and 130 degrees.

3. A cutter device according to claim 1, wherein the interior angle formed between the rear side wall and the top wall of said shield is between 110 and 130 degrees.

4. A cutter device according to claim 1, wherein said deflector plate is attached to the top wall of said shield.

5. A cutter device according to claim 4, wherein said deflector plate extends from the top wall at an angle substantially perpendicular to the front side wall of said shield.

6. A cutter device according to claim 1, and comprising a second deflector plate attached to the rear side wall of said shield, and defining a second mulch zone downstream of said first mulch zone for further slowing and deflecting debris back into contact with said cutter teeth.

7. A cutter device according to claim 6, wherein said second deflector plate extends from the rear side wall at an angle substantially perpendicular to the top wall of said shield.

8. A cutter device according to claim 1, wherein said shield further comprises substantially flat, front and rear end walls attached to respective front and rear side walls for covering a front and rear portion of the drum.

9. A cutter device according to claim 8, wherein the front end wall extends at an angle of between 120 and 140 degrees relative to the front side wall of said shield.

10. A cutter device according to claim 1, wherein the rear end wall extends at an angle of between 120 and 140 degrees relative to the rear side wall of said shield.

11. A cutter device according to claim 1, wherein said cutter teeth are arranged in a plurality of rows spaced apart around the circumference of said drum.

12. A cutter device according to claim 11, wherein adjacent ones of said rows are off-set to increase contact between the cutter teeth and the debris as the debris moves along said flow path.

13. A cutter device according to claim 1, and comprising an outwardly extending rake attached to a rear portion of said shield for being maneuvered by the working arm of the vehicle to clear sections of cut trees from the path of the vehicle.

14. In combination with a self-propelled vehicle having a movable working arm, a cutter device attached to an end of the working arm for rearing and mulching trees, said cutter device comprising:
   (a) a rotatably-mounted drum;
   (b) a plurality of spaced cutter teeth attached to an axially-extending peripheral surface of said drum for engaging and grinding trees;
   (c) a shield covering a portion of said drum and comprising a substantially flat top wall and substantially flat front and rear side walls attached to the top wall for containing the deflection of wood debris outwardly from said drum during operation, and the walls of said shield collectively defining an interior surface spaced apart from said cutter teeth and cooperating with said rotating drum to define a debris flow path through the device;
   (d) at least one deflector plate attached to at least one of the top add rear side walls on the interior surface of said shield, and extending inwardly into the debris flow path at an angle of greater than 90 degrees to the wall which it is attached and along a notional line generally tangent to the peripheral surface of said drum; and
   (e) said deflector plate and the interior surface of said shield adjacent to and upstream of said deflector plate cooperating to form a mulch zone in an area between the cutter teeth and said shield for slowing the movement of debris along the flow path, and deflecting the debris back into contact with said cutter teeth for being further cut and reduced in size.

15. A method of clearing and mulching trees, comprising the steps of:
   (a) attaching a cutter device to an end of a movable working arm of a self-propelled vehicle, said cutter device comprising a rotatably mounted drum with a plurality of spaced cutter teeth attached to an axially-extending peripheral surface of the drum for engaging and grinding the trees, and a shield covering a portion of said drum, and comprising a substantially flat top wall and substantially flat front and rear side walls attached to the top wall for containing the deflection of wood debris outwardly from said drum during operation;
   (b) creating a debris flow path through the cutter device and between an interior surface of said shield and the cutter teeth of said rotating drum;
   (c) attaching at least one deflector plate to at least one of the top and rear side walls on the interior surface of said shield, said deflector plate extending inwardly into the debris flow path at an angle of greater than 90 degrees to the wall which it is attached, and along a notional line generally tangent to the peripheral surface of said drum; and
   (d) as the debris moves along said flow path, deflecting the debris away from the interior surface of said shield and back into contact with said cutter teeth for being further cut and reduced in size.

* * * * *